Feb. 14, 1950  C. T. STEELE ET AL  2,497,191
ISOBUTYLENE PRODUCTION
Filed Dec. 20, 1946
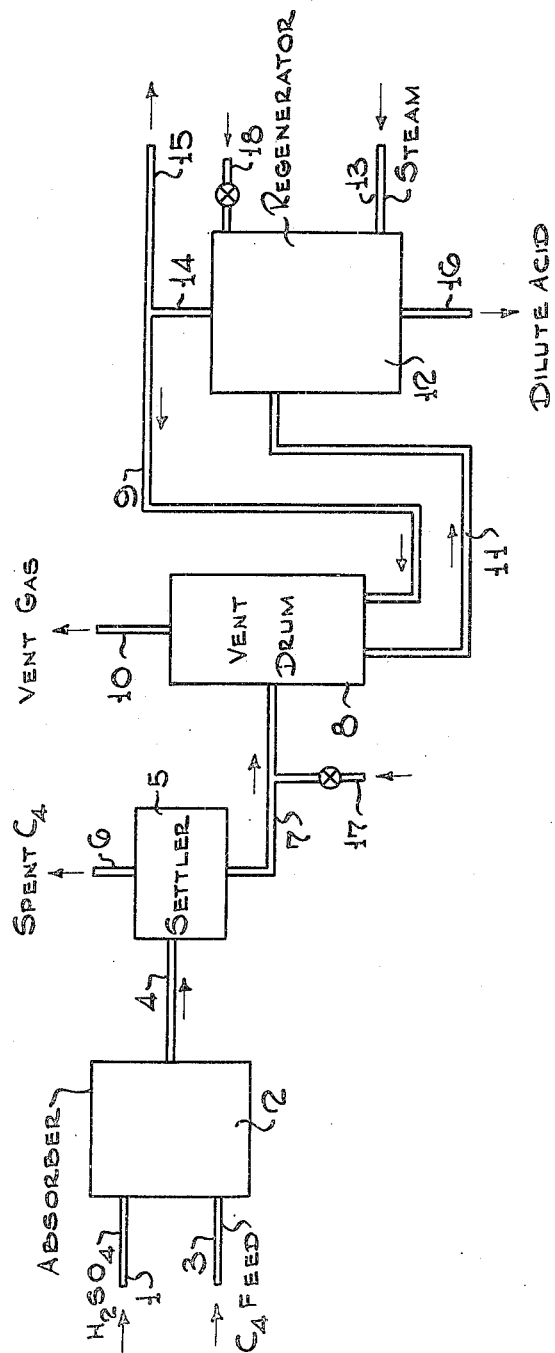
Clellie T. Steele
Ernest A. Epps, Jr.  Inventors
By P. L. Young  Attorney

UNITED STATES PATENT OFFICE 2,497,191

ISOBUTYLENE PRODUCTION

Clellie T. Steele and Ernest A. Epps, Jr., Baton Rouge, La., assignors to Standard Oil Development Company, a corporation of Delaware Application December 20, 1946, Serial No. 717,356

3 Claims. (Cl. 260—677)

This invention relates to the production of isobutylene, and particularly to the separation of concentrated isobutylene from an isobutylene-sulfuric acid extract after the removal of contaminants.

Isobutylene is most satisfactorily separated from $C_4$ fractions by absorption in acid of 55–70% strength. When an extract prepared in this manner is subjected to heating under controlled conditions the isobutylene may be regenerated from the extract in relatively pure form. In the extraction operation, however, small percentages of n-butylenes also react with the acid and are present in the final extract. Also the extract exhibits some solubility for other $C_4$ hydrocarbons. The latter include $C_4$ paraffins and n-olefins which physically dissolve in the extract. This physical solubility is especially high when operating to produce extracts of high saturation, for example, 1.0–1.5 mols of olefin per mol of acid. n-Butylenes which dissolve in the extract by reaction to form esters and secondary butyl alcohol are regenerated along with the isobutylene in the regeneration step. n-Butylenes regenerated under these conditions consist of about 10% butene-1 and about 90% butene-2. The physically dissolved hydrocarbons may be partially removed from the extract by decreasing the pressure and allowing them to escape as gases. This latter type of operation has been used in commercial plants and is definitely effective in increasing the purity of the isobutylene product. However, when dealing with extracts of high saturation, reduction of the pressure in this manner is not completely effective in removing all dissolved hydrocarbons, especially isobutane and butene-1. It is known that the butene-2 present in the isobutylene from regeneration either as a result of regeneration or as a result of physically dissolved butene-2 in the extract can be removed by distillation of the regenerated isobutylene. n-Butane can be similarly removed. However, isobutane and butene-1 cannot be removed by distillation, and hence appear in the final product isobutylene. This type of distillation is constantly used in preparing pure isobutylene for polymerization uses. In order to obtain complete removal of n-butane and butene-2 from the final product, a bottoms product is ordinarily obtained which is relatively rich in isobutylene, at least 70% and most frequently 85%.

An object of this invention is to obtain isobutylene which is substantially completely free of n-butane, isobutane, butene-2, butadiene, and butene-1.

According to this invention, an isobutylene-sulfuric acid extract is produced by extracting a butane cut, containing isobutylene, butene-1, butene-2, saturated butanes, and small percentages of $C_3$ and $C_5$ hydrocarbons, with about 55%–70% and preferably 60%–70% (wt.) sulfuric acid. The sulfuric acid, at temperatures of 60° or lower to 105° F., extracts the desired isobutylene fairly selectively. Some of the undesired n-butenes are also mechanically extracted, and some of the feed butane cut is unavoidably entrained in the product extract, in addition to physically dissolved butanes and butenes. According to this invention the amount of butene-1, butene-2 and saturated butanes in the isobutylene-sulfuric acid extract is substantially reduced from about 0.6 to 1.5% to 0.1 or lower to 0.08%.

The reduction of the contaminants may be obtained by stripping the isobutylene-sulfuric acid extract with isobutylene gas prior to regeneration of the extract, the isobutylene gas being obtained by returning a minor proportion of the regenerated isobutylene. Similarly, the isobutylene-sulfuric acid extract may be purified of its contaminants by washing with a hydrocarbon high in isobutylene content. In such a contacting operation the physically dissolved isobutane and butene-1 present in the extract are substantially completely removed therefrom. The butene-2 and n-butane physically dissolved are less completely removed. However, this is not objectionable since these latter compounds are finally removed in the distillation operation. This contacting operation may be carried out in either the liquid or gas phase using an extract which has been previously subjected to pressure reduction to partially remove some of the dissolved constituents or alternately may be carried out on an extract at the pressure involved in the absorption reaction proper. In the latter case, liquid phase operation would ordinarily be preferred; in the former case, gas phase contacting may be the preferred method. The hydrocarbon from this washing step, after separation from the extract, may be disposed of in any manner, although preferably it is recycled to the extraction stages for removal of the isobutylene therefrom. This stripping or washing operation may be carried out at any suitable temperature below that at which the regeneration of isobutylene becomes appreciable, for example, between about 50 and 110° F. The operation may be conducted countercurrently in a column or a series of contact zones, and the amount of isobutylene used for this stripping or washing operation should be sufficient to leave some of the isobutylene undissolved in the acid; this may initially be recycled to the absorber, the amount of isobutylene used will vary with the efficiency of the contact equipment and may, for example, be about 0.5% to 5% by weight of the acid extract.

The following description, with reference to the drawing, discloses one embodiment of this invention:

Sulfuric acid is passed by means of pipe 1 into absorber 2, and C$_4$ fraction, containing isobutylene, is passed by means of pipe 3 into absorber 2. Absorber 2 may be provided with mechanical mixers to obtain good contact of the sulfuric acid and the hydrocarbon. The mixture is then passed through pipe 4 into settler 5 where the undissolved gases are removed by means of pipe 6. The isobutylene-sulfuric acid extract formed is then passed by means of pipe 7 into vent drum 8, into which is passed a regenerated gas, rich in isobutylene, by pipe 9, the vented gas being removed by means of pipe 10. The isobutylene-sulfuric acid is passed by means of pipe 11 to regenerator 12 which is heated to an elevated temperature by means of steam coil 13, the isobutylene regenerated being removed by means of pipe 14, a part of the isobutylene passing through pipe 9 to vent drum 8, and substantially pure isobutylene being removed to storage by means of pipe 15. The dilute acid is removed by means of pipe 16 and may be recycled to the absorber 2. Alternately, in place of the isobutylene-rich gas, a hydrocarbon solution of isobutylene may be used to wash the isobutylene-sulfuric acid extract in vent drum 8.

Alternately the isobutylene acid extract may be substantially freed of paraffinic hydrocarbons by flashing the extract into a zone maintained under a vacuum of 1–14 pounds per square inch absolute, preferably 7 pounds per square inch absolute, the flashed and purified extract may then be regenerated to recover isobutylene.

The following table illustrates the effects of stripping with isobutylene:

| Infrared analysis wt. percent C$_4$ basis | I Analysis of plant product from steam stripping of extract | II Analysis of plant product from steam stripping of extract | III *See below | IV Same as III except extract stripped with i-C$_4$H$_8$ gas(a) prior to steam stripping |
|---|---|---|---|---|
| Cis C$_4$H$_8$-2 | 1.4 | 1.5 | 2.0 | 1.6 |
| Trans C$_4$H$_8$-2 | 1.3 | 1.7 | 0.8 | 0.3 |
| C$_4$H$_8$-1 | 1.4 | 1.6 | 1.7 | 0.7 |
| C$_4$H$_6$(b) | 0.6 | 0.3 | 0.2 | 0.1 |
| i-C$_4$H$_8$ | 95.3 | 94.9 | 95.3 | 97.3 |

(a) i-C$_4$H$_8$ bubbled through extract approximately 10 minutes with total volume of gas approximately 10 times volume of extract, at 90 to 100° F. and atmospheric pressure.
(b) By ultraviolet absorption.
*Analysis of plant product from steam stripping of extract.

The acid extract may be diluted to 40–45% acid concentration before or during regeneration in order to avoid excessive production of dimers if temperatures higher than 100° F. are used. The dilution may be accomplished by passing an aqueous alcohol concentrate to the vent drum by means of pipe 17 and as reflux in the regenerator 12 by means of pipe 18. The dilution may be made by passing steam through an open steam pipe in place of the steam coil 13.

We claim:

1. A process for the production of substantially pure isobutylene from an isobutylene fraction containing isomeric butene-1 and butenes-2 which are difficult to remove therefrom which comprises contacting the isobutylene fraction with sulfuric acid of 55–70 wt. per cent concentration to form an isobutylene-sulfuric acid extract contaminated with physically dissolved and mechanically entrained isomeric butene-1 and butenes-2, stripping the contaminated extract with an isobutylene fraction substantially free of butene-1 whereby the physically dissolved and mechanically entrained isomeric butene-1 and butenes-2 are removed from the extract, and thereafter stripping the purified extract with steam to recover therefrom isobutylene substantially free of isomeric butene-1 and butenes-2.

2. A process according to claim 1 in which the amount of isobutylene employed in the stripping of the extract is 0.5 to 5% based on the weight of the acid extract.

3. A process for the production of substantially pure isobutylene from an isobutylene fraction containing isomeric butene-1 and butenes-2, n-butane and isobutane which are difficult to remove therefrom which comprises contacting the isobutylene fraction with sulfuric acid of 55–70 wt. percent concentration to form an isobutylene-sulfuric acid extract contaminated with physically dissolved and mechanically entrained isomeric butene-1, butenes-2, n-butane and isobutane, stripping the contaminated extract with an isobutylene fraction substantially free of butene-1 whereby the butene-1 and isobutane are substantially completely removed from the acid extract and the butenes-2 and n-butane partially removed from the extract, stripping the partially purified acid extract with steam to recover therefrom isobutylene contaminated with the remaining traces of butenes-2 and n-butane and separating pure isobutylene from the remaining traces of butenes-2 and n-butane by fractional distillation.

CLELLIE T. STEELE.
ERNEST A. EPPS, JR.

REFERENCES CITED

The following references are of record in the file of this patent:

UNITED STATES PATENTS

| Number | Name | Date |
|---|---|---|
| 2,012,785 | Deanesly et al. | Aug. 27, 1935 |
| 2,144,692 | Schuftan | Jan. 24, 1939 |
| 2,180,386 | Balcar | Nov. 21, 1939 |
| 2,369,559 | Gilliland | Feb. 13, 1945 |
| 2,380,350 | Willauer et al. | July 10, 1945 |
| 2,388,928 | Morrell et al. | Nov. 13, 1945 |
| 2,400,340 | Cone | May 14, 1946 |